United States Patent Office.

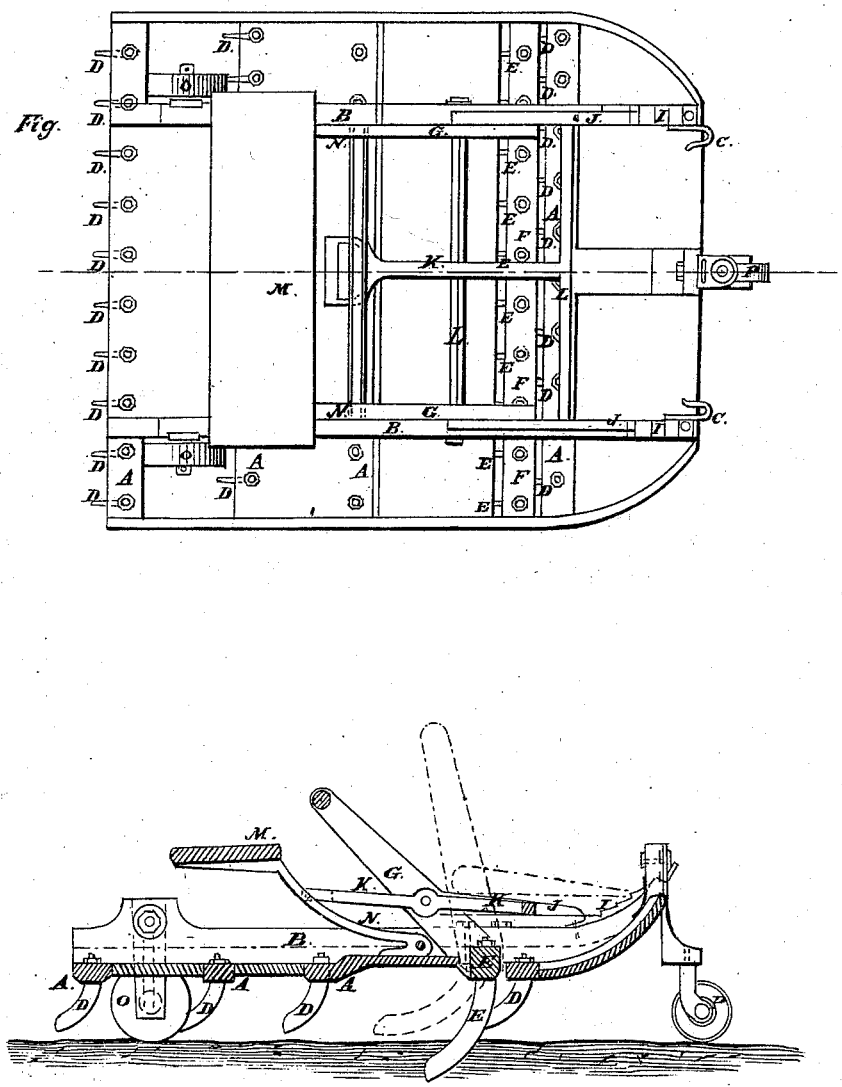

JACOB CLICK, OF SPRINGFIELD, OHIO.

Letters Patent No. 68,139, dated August 27, 1867.

---

IMPROVEMENT IN HARROWS.

---

The Schedule referred to in these Letters Patent and making part of the same.

---

TO ALL WHOM IT MAY CONCERN:

Be it known that I, JACOB CLICK, of Springfield, in the county of Clark, and State of Ohio, have invented a new and useful Improvement in Earth-Pulverizers or Harrows; and I do hereby declare the following to be a full, clear, and exact description of the same, reference being had to the accompanying drawings, in which—

Figure 1 is a plan view of my invention.

Figure 2 is a side elevation of the same.

That others may understand the construction and operation of my invention, I will particularly describe it.

A A are the transverse timbers forming the frame. These timbers are securely fastened by bolts or otherwise to the longitudinal timbers B B, to the front ends of which are attached the draught-hooks C C, to which the team is attached to draw the apparatus. To each of the transverse timbers A are secured the curved teeth D D, which cut and pulverize the earth as the implement is drawn forward. These teeth are curved backward, as shown in fig. 2, and the forward or convex edge is sharpened, so that the soil is not merely dragged and disturbed but is cut and severed, and therefore it is disturbed to a much greater depth than would be the case were the teeth blunt. At the upper end of each tooth a shoulder and tang are forged, and the latter is passed through a hole in the transverse timber A A, and there secured by screw-nuts. It is frequently desirable to disturb the soil to a much greater depth than is ordinarily required. I therefore provide the long teeth E, which are in form and construction like the teeth D, only they are of greater length, as shown. These teeth are attached to the shaft F, which may be rotated upon its axis in proper bearings to a certain extent, sufficient to move the teeth E from a position nearly horizontal to a position nearly vertical, as shown by black and red lines in fig. 2. The levers G G, and connecting-bar H, project from the side of the shaft F, and by them the attendant is enabled to rotate the shaft F when desired, but as it would be difficult for him to retain it in the desired position by his unaided strength, I therefore provide the ratchets I I upon the front ends of the timbers B B, which, for convenience and the production of the best result, are curved upward. The pawls J J are pivoted to the levers G G, and as the said levers are drawn backward the pawls engage with the teeth of the ratchet and prevent a return of the levers forward until such time as the attendant chooses. When it is desired to release the levers G and permit the teeth E to swing backward again, the attendant draws the cross-bar H backward, and with it the levers G G, until the pawls J J are relieved from pressure, when they may be simultaneously raised from the ratchet by means of the handle K, which is attached to the connecting-bar L, and extends thence backward beneath the cross-bar H and to a point convenient to the hand of the attendant. The seat M is mounted upon the spring-bars N, and extends entirely across the frame, so that the driver may shift his position as he may desire, and the cross-bar H being of nearly or about the same length, the driver may operate the levers G wherever he may be sitting upon the seat M. The intervals between the transverse timbers A A are to be filled with boards, so that the upper surface of the machine presents the appearance of a platform, upon which ballast may be laid to increase the penetration of the cutting teeth. The teeth D D are arranged so that the teeth of each succeeding row will strike between the lines of the preceding rows. The adjustable wheels O O and P may be used, if desirable, to limit or regulate the depth to which the teeth D shall penetrate the ground. They are mounted upon slotted slides which move in guides, and are retained in any position by set-screws which pass through said slots. The wheel P is also a caster-wheel, to enable the machine to be turned readily while moving. The wheels O O P serve also for the transportation of the machine to and from the field.

Having described my invention, what I claim as new, and desire to secure by Letters Patent, is—

1. Constructing a harrow with a series of long, curved, and sharp-edged teeth or knives, secured to a rotating shaft, so that they may be depressed to cut deeply into the ground when desired, substantially as and for the purpose set forth.

2. A harrow, constructed with the curved sharp-edged teeth D D and a series of long knife-shaped teeth, E, secured to the rotating shaft F provided with the levers G G, by which said knives E may be depressed to cut deeply into the ground when desired, substantially as set forth.

3. In combination with the shaft F and levers G G, the pawls J J and ratchets I I, substantially as and for the purpose set forth.

4. In combination with the harrow A, and the long seat M mounted thereon, the levers G G, joined at their upper ends by the long connecting-rod N, as and for the purpose set forth.

5. In combination with the harrow A, the adjustable wheels O O P, for the purpose of limiting the depth to which the teeth or knives may cut.

<div style="text-align:right">
his<br>
JACOB × CLICK.<br>
mark.
</div>

Witnesses:
   D. A. HARRISON,
   JOHN KILLINGER.